Patented Aug. 16, 1938

2,127,141

UNITED STATES PATENT OFFICE 2,127,141

COMPOSITION AND PROCESS FOR DEMULSIFYING CUT OILS AND THE LIKE

Harold Jay Robertson, Tulsa, Okla., assignor to Sinclair Refining Company, New York, N. Y., a corporation of Maine No Drawing. Application December 29, 1934, Serial No. 759,768

8 Claims. (Cl. 196—4)

In the operation of oil wells, there is commonly produced, in addition to crude petroleum, a greater or less amount of emulsion in which oil is the continuous phase and brine or water in minute globules is dispersed therein. These emulsions are commonly known as "cut" or "roily" oils, or "bottom settlings" and are of little or no value as such. It has long been a practice in the oil field and at refineries to treat these emulsions with so-called emulsion breakers, to separate the brine or water from the oil to render the latter available for use. Among the more or less successful emulsion breakers are water softening agents such as soluble soaps, fatty acids, rosin soap and fatty substances which are used with or without various other additions, by mixing in small proportions with the emulsion to be freed of brine. It is generally recognized that in the treatment of such emulsions with water softening agents of the type exemplified above, the separation of the water from the oil is effected by the penetration of the water softening agent to the water of the droplets through the interface or envelope of mineral emulsion agent surrounding the droplets and by which they are held in suspension in the oil, and that the water softening agent in some manner neutralizes the emulsifying effect of such agents or dissipates them thus releasing the water or brine, which is precipitated from the oil.

Cut oils differ very widely among themselves with respect to the difficulty of resolving the emulsion, some of them being little, if at all, affected by the use of water softening agents alone. The greater resistance of some oils to demulsification appears to be due to the fact that the emulsifying agent therein, constituting the envelopes surrounding the water particles, offers greater resistance to the penetration of the water softening agent to the interior of the droplets.

I have found that the resolution of such emulsions and, more particularly, of the more refractory emulsions by such water softening agents, is greatly assisted by the presence in the demulsifying compound of certain substances of resinous character. This I ascribe to the effect of the resinous constituent on the surface tension at the interface between the water or brine of the dispersed phase and the oil of the continuous phase. Whether or not this be the true explanation, the fact remains that the addition to the treating compound of the resinous materials hereinafter described renders the compound much more effective especially in demulsifying some of the more difficultly resoluble emulsions.

The resinous materials which I have found particularly effective in assisting the demulsifying action of water softening compounds, such as soluble soaps, and fatty substances from which the soaps are made, are the ammonia reaction products of the aldehydes and ketones and in particular compounds of the formula

in which "R" is a hydrocarbon radical and "$R_1$" is a radical selected frm the class consisting of hydrogen and hydrocarbon radicals, which not only promote the separation of the oil and water phases but improve the clarity or brightness of the treated oil. It is well known that ammonia readily reacts with aldehydes and ketones to form such products. With aldehydes of the aliphatic series, an addition product, aldehyde ammonia, is formed, while those of the cyclic series, condensation products, such as hydro benzamide and hydro furamide are formed. With ketones, strong ammonia reacts to form complex condensation products. However, the ammonia reaction products of all of the aldehydes and ketones are more or less resinous in character and I believe it to be mainly or entirely because of this characteristic that they are so effective in assisting the action of demulsifying agents such as water softening materials.

These ammonia reaction products of aldehydes and ketones may be made in a well known manner and added in proper proportion to the water softening agents. In any proportion they are useful to assist the demulsifying action, the amount to be added to the water softening agent depending upon the specific character of the cut oil or the like to be resolved.

Preferably the demulsifying composition includes, in addition to the soap and ammonia reaction products of an aldehyde or ketone, an aldehyde or ketone hydrogen alkali sulfite, and it may also contain fatty matter such as a fixed oil.

A specific example of a demulsifying composition embodying the present invention in a preferred form is as follows:

| | Parts by weight |
|---|---|
| Ammonium ricinoleate | 46.00 |
| Free ammonia | 0.86 |
| Furfural potassium hydrogen sulfite | 8.93 |
| Hydro furamide | 0.29 |
| Castor oil | 30.00 |
| Water | 13.69 |

The furfural potassium hydrogen sulfite included in the above formula was prepared as follows:

I dissolved 20 parts by weight of potassium meta bi-sulfite (56.4% available $SO_2$), in granulated form, in 38 parts by weight of water, heating slightly to get complete solution of the salts. To this solution, after cooling, I added 21.8 parts by weight of furfural (technical, 97%), stirring and cooling when necessary to prevent too rapid rise in temperature. The amount of furfural required is calculated from the available $SO_2$ in the bi-sulfite and the purity of the furfural, which latter is determined by chemical test. It is desirable to use an amount of furfural at least sufficient to convert all of the sulfite and an excess of the former is unobjectionable.

The above demulsifying composition was prepared from the following ingredients in the following proportions by volume:

| | |
|---|---|
| Ricinoleic acid | 46.40 |
| Aqua ammonia (26° Bé.) | 9.28 |
| Furfural potassium hydrogen sulfite solution, prepared as above indicated | 11.60 |
| Furfural | .27 |
| Castor oil | 30.91 |
| Aqua ammonia (26° Bé.) | 1.54 |

The ricinoleic acid may be saponified by ammonia in an obvious manner. Preferably, the fatty acid is introduced into a kettle and strong ammonium hydroxide, preferably commercial 26 degrees Bé. aqua ammonia, is added slowly with stirring and cooling when necessary to prevent undue rise in temperature, which would result in an unnecessary loss of ammonia by evaporation. Strong ammonia is used to keep the water content as low as possible, as too much water has a tendency to jell. The fatty acid may be partially replaced by rosin, in which event the mixture, prior to saponification, is heated until the rosin is completely dissolved. It is preferable, also, to add the castor oil in the kettle, though it may be added later.

After the saponification is complete, the furfural potassium hydrogen sulfite solution, furfural and ammonia, may be added. Preferably, as in forming the specific demulsifier of the above formula, furfural is added in excess to the extent indicated in the table in forming the furfural potassium hydrogen sulfite solution and thereafter ammonia is added in sufficient quantity to combine with the excess furfural to form the ammonia aldehyde, or if a basic compound is desired, in excess. In the formula given, the excess furfural and the equivalent ammonia correspond to approximately 1.07 pounds hydro furamide per 100 gallons of the demulsifying compound, the ammonia being somewhat in excess to render the compound slightly basic in reaction, as certain emulsions respond more readily to treatment with basic demulsifying agents.

Other saponaceous water softening agents may be employed; thus, instead of ricinoleic acid, other soap forming acids may be employed, but I prefer that specified as it makes a more liquid product. Also, other alkalis than ammonia may be used to form the soap but the latter is preferable for the same reason. Instead of the furfural potassium hydrogen sulfite solution, a similar solution of other aldehyde or ketone alkali hydrogen sulfite solutions may be used and prepared in a manner which will be obvious from the above description of the specific example given. For the castor oil, other fatty materials may be substituted, but it is desirable for the sake of fluidity to use castor oil or other low test fixed oil. The fatty matter may be increased or lessened with respect to the proportion given, or, in some cases, be omitted altogether.

The proportions given in the specific example are illustrative and it is to be understood that they may be varied widely according to the specific character of the emulsion to be treated. So also the amount of the composition to be used with reference to that of the emulsion to be treated will vary depending upon the character of the latter. As a specific example, I have used with success on a difficultly resoluble cut oil, a ratio corresponding approximately to one gallon of the specific compound described to 100 barrels of emulsion treated.

I claim:

1. A demulsifying composition for cut oils and the like comprising a water softening reagent and ammonia furfural.

2. A demulsifying agent of the class described comprising a water softening reagent, an alkali hydrogen sulphite of a reagent of the group consisting of aldehydes and ketones, and an ammonia reaction product of a reagent of the group consisting of aldehydes and ketones.

3. A demulsifying composition for cut oils and the like comprising an ammonium soap of ricinoleic acid, an alkali hydrogen sulphite of a reagent of the group consisting of aldehydes and ketones, and an ammonia reaction product of a reagent of the group consisting of aldehydes and ketones.

4. The process of breaking petroleum emulsions which comprises subjecting the emulsion to the action of a reagent including a water softening agent, an alkali hydrogen sulphite of a compound of the group consisting of aldehydes and ketones and a reaction product of ammonia and a compound of the group consisting of aldehydes and ketones.

5. The process of breaking petroleum emulsions which comprises subjecting the emulsion to the action of a reagent including an ammonia soap of ricinoleic acid and a reaction product of ammonia and a compound of the group consisting of aldehydes and ketones.

6. The process of breaking petroleum emulsions which comprises subjecting the emulsion to the action of a reagent including an ammonia soap of ricinoleic acid, an alkali hydrogen sulphite of a compound of the group consisting of aldehydes and ketones and a reaction product of ammonia and a compound of the group consisting of aldehydes and ketones.

7. The process of breaking petroleum emulsions which comprises subjecting the emulsion to the action of a reagent including a water softening agent and a reaction product of ammonia and a compound of the formula

in which R is a hydrocarbon radical and $R_1$ is a radical selected from the class consisting of hydrogen and hydrocarbon radicals.

8. The process of breaking petroleum emulsions which comprises subjecting the emulsion to the action of a reagent including a water softening agent and a reaction product of ammonia and a compound of the formula RCHO in which R is a hydrocarbon radical.

HAROLD JAY ROBERTSON.